(12) United States Patent
Yuen

(10) Patent No.: US 6,456,338 B1
(45) Date of Patent: Sep. 24, 2002

(54) TELEVISION TUNING SYSTEM

(75) Inventor: Henry C. Yuen, Pasadena, CA (US)

(73) Assignee: E Guide, Inc., Beverly Hills, CA (US)

( * ) Notice: Subject to any disclaimer, the term of this patent is extended or adjusted under 35 U.S.C. 154(b) by 0 days.

(21) Appl. No.: 09/125,640

(22) PCT Filed: Feb. 28, 1997

(86) PCT No.: PCT/US97/03243

§ 371 (c)(1),
(2), (4) Date: Dec. 30, 1998

(87) PCT Pub. No.: WO97/32434

PCT Pub. Date: Sep. 4, 1997

Related U.S. Application Data
(60) Provisional application No. 60/012,483, filed on Feb. 29, 1996.

(51) Int. Cl.⁷ .................................................. H04N 5/50
(52) U.S. Cl. ........................ 348/731; 348/569; 348/563
(58) Field of Search ................................ 348/569, 570, 348/563, 564, 731, 732, 906; 725/39, 56; H04N 5/50, 5/445

(56) References Cited

U.S. PATENT DOCUMENTS 4,977,455 A    12/1990  Young .......................... 358/142
5,223,924 A    6/1993   Strubbe ......................... 358/86
5,353,121 A    10/1994  Young et al. ................. 348/563
5,465,113 A    11/1995  Gilboy ......................... 348/5.5
5,585,866 A    12/1996  Miller et al. ................. 348/731
6,075,570 A  * 6/2000   Usui et al. .................... 348/569
6,111,614 A  * 8/2000   Mugura et al. ............. 348/569
6,133,909 A  * 8/2000   Schein et al. ................ 348/906
6,133,962 A  * 8/2000   Proehl et al. ................ 348/569
6,118,492 A  * 9/2000   Milnes et al. ................ 348/563
6,266,814 B1 * 7/2001   Lemmons et al. ............. 725/44

FOREIGN PATENT DOCUMENTS

WO         WO 9501057      1/1995

* cited by examiner

Primary Examiner—Sherrie Hsia
(74) Attorney, Agent, or Firm—Christie, Parker & Hale, LLP

(57) ABSTRACT

An improved television control system includes a tuner (15), a memory (13), a keyboard (14) and a controller (11). The tuner (15) selects one channel from a multi-channel television signal based upon a channel selection input. The multi-channel television signal carries the signals for a set of received television channels. The memory (13) contains a favorite channel list that includes a list of channel identifiers, each channel identifier corresponding to one of a subset of the set of channels received by the tuner (15). The keyboard (14) includes a favorite channel button (16) and a favorite program button (16) as well as a numeric keypad (30) and channel up/down keys (28).

9 Claims, 1 Drawing Sheet

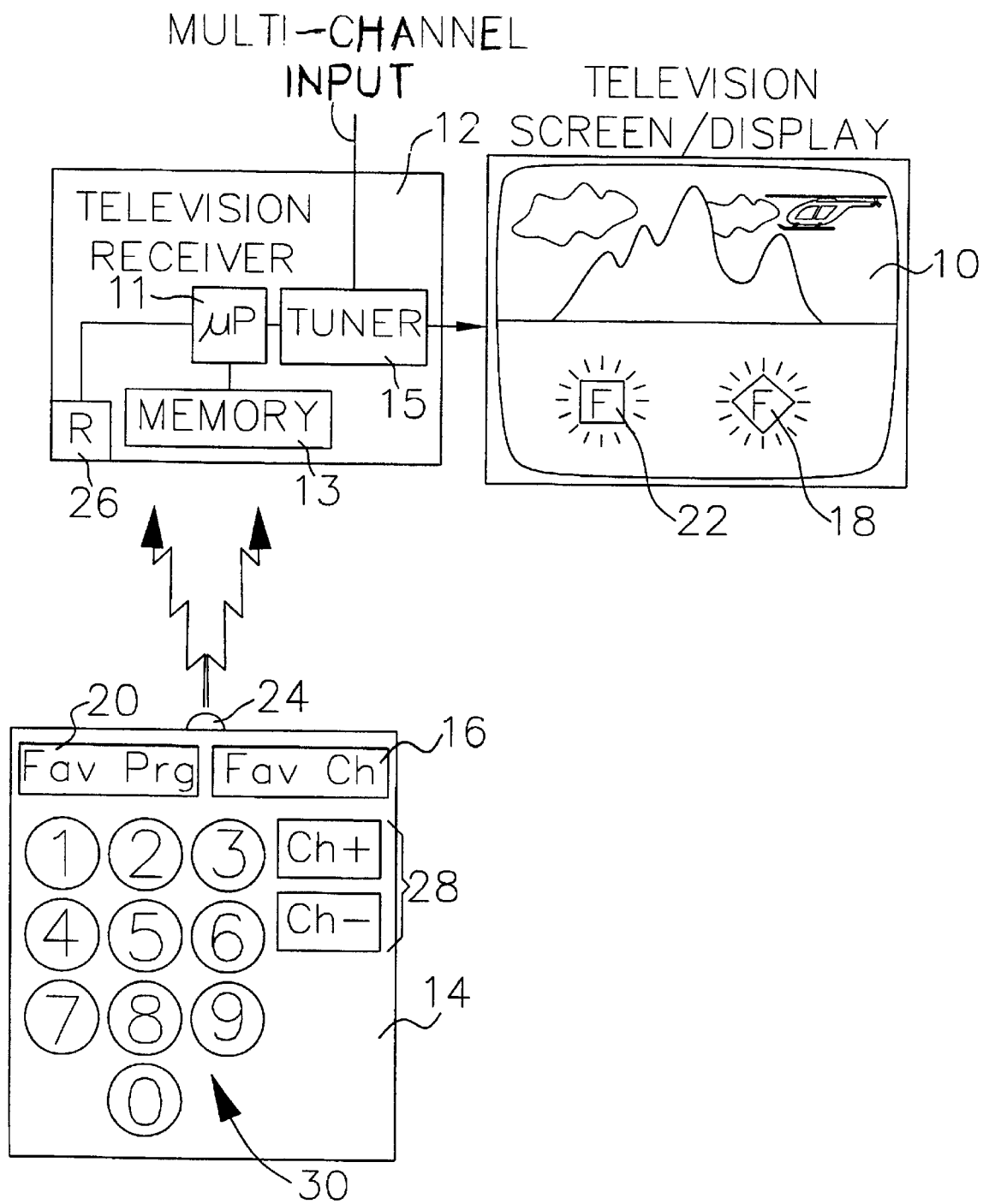

TELEVISION TUNING SYSTEM

RELATED APPLICATION

This application is based on and claims the priority of provisional patent application Serial No. 60/012,483 filed Feb. 29, 1996.

BACKGROUND OF THE INVENTION

Television systems are available with what is often described as a favorite channel feature. This feature allows a consumer to program some but not all of the channels that the consumer receives through his television system into a special "favorite channel" list. The consumer can then choose to use the traditional channel up and down buttons on the television system to scroll through just those channels selected by the consumer to be on the favorite channel list. Some systems also allow consumers added flexibility, by allowing them to change the order in which the channels appear on the favorite channel list. It is important to note that such television systems as have just been described are not limited to inclusion in television sets, per se, but also have been implemented in other consumer electronics components such as universal remote controls, VCR's, cable boxes, satellite receivers and stand alone electronic television program schedule boxes.

Another feature that is common in television systems is a last channel button. Pressing such a button tunes the television system not to the television currently being viewed but the channel to which the television system was tuned immediately preceding the present channel tuned. Repeated activations of the last channel button will toggle between the last two channels selected using the television system.

BRIEF DESCRIPTION OF THE DRAWINGS

The FIGURE shows a block diagram of an embodiment of the invention.

DETAILED DESCRIPTION

A television system, as shown in the FIGURE, includes a television display 10, connected to a television receiver 12 via RF, baseband video, S-video or other conventional manner. The television receiver 12 might be implemented as part of a television set, together with the television display or in any consumer electronics device normally connected to a television display, such as a cable box, VCR, satellite receiver (C-band or direct satellite) or stand alone electronic television program schedule device. The television receiver includes an electronic television tuner 15 that is controlled by a microprocessor control 11 to tune one among many signals received on a multi-channel input, such a television antenna output, satellite antenna output, cable television signal or the like. The microprocessor control operates with memory 13. The television receiver also includes a remote control 14 to allow the consumer to issue commands to the television receiver that are communicated from transmitter 24 to receiver 26. The remote control includes channel up/down keys 28, a numeric keypad 30 and a favorite channel button 16.

In alternative embodiments, the television tuner 15 may be physically separated from the microprocessor control 11 and memory 13. An example of these alternative embodiments is where the microprocessor control 11 and memory 13 are located in a television set, while the system uses a VCR or an external cable box as the electronic television tuner 15. In such alternative embodiments, at least a one-way communication link is established between the microprocessor control and the electronic television tuner, such an RF or infrared link. In a further alternative embodiment, the microprocessor and memory may be located in remote control 14.

While watching television, if the consumer is watching a channel that the consumer wants to designate as a "favorite" channel, the consumer presses and holds the favorite channel button until an icon 18 appears on the corner of the television screen, indicating that the television receiver has accepted the programming of that channel as a favorite channel. This icon is displayed on the screen using conventional on-screen display techniques. The on-screen display circuitry can be located in either the television receiver 12 or the television display 10. In the case where the on screen display circuitry is included in the television display, at least a one-way communication link is required between the television receiver and the television display to indicate the content and timing of on screen displays, including the icon 18. In alternative embodiments, the graphics data for the icon are stored in either the memory of the television receiver or a memory connected to the television display.

After two or more favorite channels have been programmed in this manner, each time the favorite channel button is pressed for a short duration (quick pressing the button), the television receiver tunes to the next programmed favorite channel in a rotation format. Each time a favorite channel is tuned, either directly using the numeric keypad or channel up/down keys or by using the favorite channel button, the favorite channel icon appears on the screen for a relatively short time. If a consumer decides that they no longer want a channel that has been programmed as a favorite channel to be a programmed favorite channel, the consumer tunes the television system to that channel, by either pressing the channel number, using the channel up/down keys or quick pressing the favorite channel button until that channel is tuned. Once the channel that is no longer desired to be a favorite channel is tuned, the user again presses, but now "holds" the favorite channel button down until the icon shown in the corner of the screen disappears. In one embodiment, holding the favorite channel button down for less than one second is considered by the microprocessor control to be a quick press, while holding the button down for one second or more is considered a "hold" of the button.

An alternative embodiment of the system according to this invention includes a favorite program feature. Another button that can be added to the remote is a favorite program button 20. When a consumer is viewing a television show which is one of the consumer's "favorite" shows, they can press and hold the favorite program button until a favorite program icon 22, as distinguished from the favorite channel icon 18 described earlier, appears in the corner of the screen (alternatively, the icon can be located in a different corner or different area of the screen than the favorite channel icon). When a favorite program is thus selected, the television system then stores not only the channel presently tuned but also the day of the week, start time, and end time for the program then being viewed. The television system, from then on, will add the channel for this program to the favorite channel list, but only on the day of the week and during the times that the particular favorite program is normally scheduled to air. At other times the channel would not be included in the favorite channel list. For example, if a consumer selects the following favorite shows: a program that airs on channel 2 on Mondays from 8:00 p.m. until 9:00 p.m., a show that airs on channel 4 on Mondays from 8:00 p.m. until 8:30 p.m. and a show that airs on channel 7 on Mondays from 8:30 p.m. to 9:00 p.m., than between 8:00 p.m. and 8:30 p.m., the favorite channel list will be deleted from the favorite channel list and channel 7 will be added to the favorite channel list.

In the preferred embodiment of the embodiment with the favorite program feature, the system also includes an electronic program schedule that can supply the start time and end time of a program then being viewed for inclusion into the favorite channel list. A simple real time clock, which is already included in many consumer electronic devices, can supply the day of the week. An alternative embodiment with the favorite program feature obtains the start and end time from supplementary information that is broadcast in the vertical blank interval ("VBI") with the program being viewed such as information that is part of the Extended Data Service ("XDS").

In an enhancement of the last two embodiments described, when the favorite program button is pressed and held, the television system will detect the title of the television show currently being aired from either supplementary information in the television signal or from an electronic program schedule. The title will then be stored in a favorite program title list. Thereafter, the titles of all shows presently being broadcast can be compared with the titles in the favorite program title list, with the channels of all the programs being currently aired with titles that match titles on the favorite program title list being added to the favorite channel list until such programs are concluded. Thus, for example, if the favorite program button is pressed and held while an episode of "I Love Lucy" is being aired, the title "I Love Lucy" or some representation of this is stored in the favorite program title list. Thereafter, whenever "I Love Lucy" is aired, on any channel, the channel on which "I Love Lucy" is then being broadcast is added to the favorite channel list until that episode of "I Love Lucy" is over. If "I Love Lucy" is aired on more than one channel at the same time, all channels on which "I Love Lucy" is being aired at a particular time will be present on the favorite channel list. Thus, at any time, quick pressing the favorite channel button will show the consumer any channel that is currently broadcasting "I Love Lucy."

What is claimed is:

1. A television control system comprising:
   a tuner for selecting one channel from a multi-channel television signal based upon a channel selection input, wherein the multi-channel television signal carries the signals for a set of received channels;
   a memory circuit wherein a favorite channel list that comprises a list of channel identifiers, each channel identifier corresponding to one of a subset of the set of received channels is stored;
   a favorite channel button capable of programming and selecting a favorite channel and
   a controller communicatively connected to the tuner, the memory circuit and the favorite channel button, the controller comprising:
   a first instruction set causing the controller to add a channel identifier corresponding to the channel then being tuned by the tuner to the favorite channel list when the favorite channel button is momentarily pressed; and
   a second instruction set causing the controller to remove a channel identifier corresponding to the channel then being tuned by the tuner from the favorite channel list when the favorite channel button is pressed and held.

2. The system of claim 1 further comprising means for cyclically tuning the channels corresponding to the channel identifier in the favorite channel list.

3. The system of claim 2 further comprising:
   means, communicatively connected to the controller, for displaying a favorite channel icon on a television screen;
   means for displaying the favorite channel icon when the channel tuned by said tuner corresponds with a channel identifier in the favorite channel list; and
   means for ceasing the display of the favorite channel icon when the channel tuned by the tuner does not correspond to a channel identifier and when a channel identifier corresponding to the channel then being tuned by the tuner is removed from the favorite channel list.

4. The system of claim 2 wherein the memory circuit further comprises a favorite program list comprising television program identifiers, wherein the system further comprises:
   a favorite program input means;
   means for adding a program identifier corresponding to the program then tuned by the tuner to the favorite program list when the favorite program input means is operated in a first predetermined manner; and
   means for removing a program identifier for a program then being tuned by the tuner to the favorite program list when the favorite program input means is operated in a second predetermined manner.

5. The system of claim 4 wherein the program identifier comprises a subset of the channel, date, day of the week, start time, end time and length for the program then being tuned by the tuner.

6. The system of claim 4 wherein the program identifier comprises a representation of the title of the program then being tuned by the tuner.

7. The system of claim 5 or 6 wherein the program identifier is derived from data received from an electronic program schedule system.

8. The system of claim 5 or 6 wherein the program identifier is derived from data embedded in the television signal.

9. The system of claim 4, 5 or 6 further comprising means for adding a channel identifier corresponding to the channel on which a program corresponding to a program identifier on the favorite program list is being broadcast, while such program is being broadcast.

\* \* \* \* \*